Figure 1:
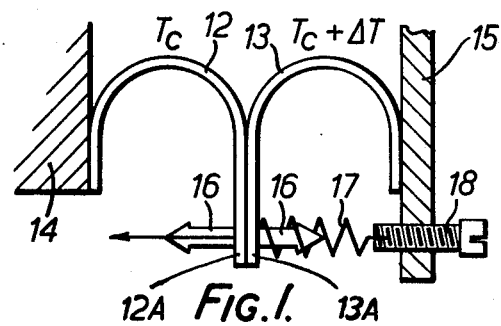

United States Patent [19]

Hart et al.

[11] 4,191,053
[45] Mar. 4, 1980

[54] TEMPERATURE-RESPONSIVE ACTUATOR

[75] Inventors: William B. Hart, Ipswich; Reginald T. Williams, Hadleigh, both of England

[73] Assignee: Delta Materials Research Limited, Ipswich, England

[21] Appl. No.: 964,935

[22] Filed: Nov. 30, 1978

[51] Int. Cl.² ............................................. G01K 5/60
[52] U.S. Cl. .................................. 73/363.1; 73/190 H
[58] Field of Search .................... 73/363, 363.1, 363.5, 73/340, 190 H, 363.7, 363.9; 337/139, 140; 137/468; 236/101 R, 93 R

[56] References Cited

U.S. PATENT DOCUMENTS

| | | | |
|---|---|---|---|
| 3,254,180 | 5/1966 | Flanagan | 337/140 |
| 3,403,238 | 9/1968 | Buehler et al. | 337/140 |
| 3,594,674 | 7/1971 | Wilson | 337/139 |

*Primary Examiner*—Donald O. Woodiel
*Attorney, Agent, or Firm*—Wigman & Cohen

[57] ABSTRACT

A differential temperature detector comprises two springs made of a shape memory effect alloy. The springs are oppositely stressed and are coupled together in stressed condition. When the springs are subject to the same temperature, no movement occurs when that temperature changes, but when the springs are subject to different temperatures, movement occurs dependent on the temperature difference.

11 Claims, 8 Drawing Figures

TEMPERATURE-RESPONSIVE ACTUATOR

This invention relates to a temperature-responsive actuator capable of performing an actuating function on change of temperature, for example to operate an indicator or to affect a control.

Such actuators are well known and usually take the form of bi-metallic elements, which change their shapes with change of temperature; the efforts exerted by a bi-metallic element is limited. Actuator incorporating so-called "shape memory effect materials" have also been suggested. Thus, U.S. Pat. No. 3,594,674 issued to James R. Willson on July 20, 1971 describes the use of helical spring which is made of nickel-titanium shape memory alloy and which is arranged to operate electrical contacts when subject to temperature change.

A shape memory effect material as described in the above-mentioned U.S. patent and as employed in the present invention has an elastic modulus which varies significantly with temperature in a reversible manner over a transition temperature range. In the case of an alloy, the variation of elastic modulus withtemperature is associated with the martensitic transformation of the alloy, and accordingly the alloy is heat treated in known manner prior to use to bring it to a martensitic condition. The transition temperature range is dependent on the composition of the alloy and corresponds to the range through which the martensitic transformation takes place. Outside that range, change of temperature has little affect on elastic modulus until the temperature becomes so excessive that the martensitic condition is lost.

The actuators employing shape memory effect material and described in the above-mentioned U.S. patent and elsewhere are responsive to the absolute temperature of the material and are incapable of responding to the difference in temperatures at two different locations. However, differential temperature actuators are frequently needed.

An object of the present invention is to provide an actuator which utilises shape memory effect materials and which responds only to differences in temperatures at different locations, but is substantially unresponsive to a change of temperature occurring at both locations.

The present invention provides a differential temperature detector which comprises a first resilient member having a fixed part and a relatively movable part; and a second resilient member having a fixed part and a relatively movable part; each of said first and second resilient members being made essentially of a shape memory effect material having an elastic modulus which varies significantly with temperature in a reversible manner over a transition temperature range, said movable parts of said resilient members being coupled together with said members stressed in opposition, wherby the position of said movable part of one of said members relative to said fixed part is indicative of the difference in temperatures of said members.

The shape memory effect material is preferably an alloy and may be any such alloy exhibiting the stated property. Thus, it may be a nickel-titanium alloy, but a copper-zinc-aluminium alloy is preferred, the constituents being in proportions chosen to give a required transition temperature range.

Figure 2:
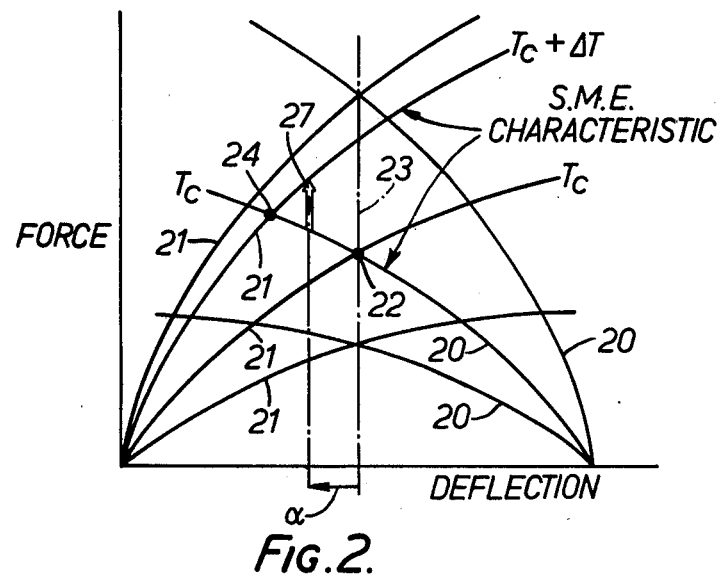
Figure 3:
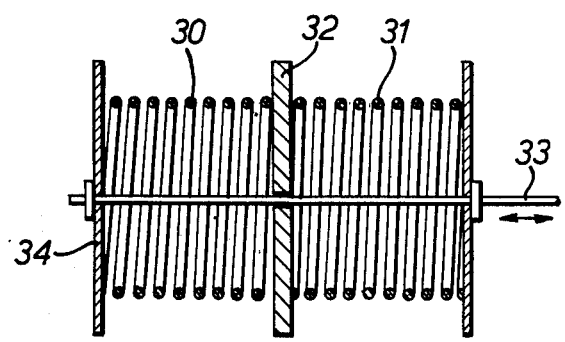
Figure 4:
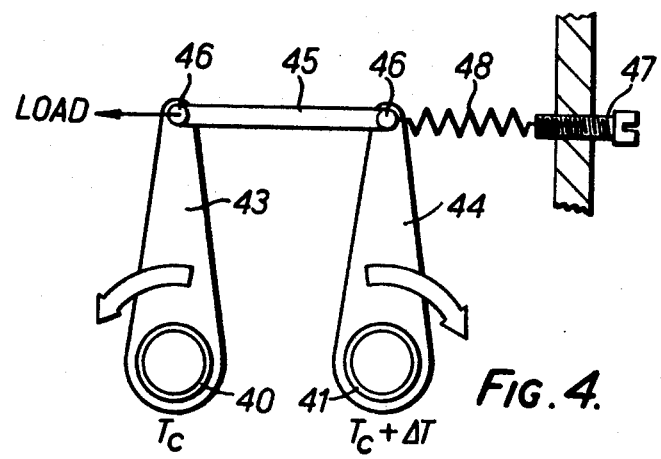
Figure 5:
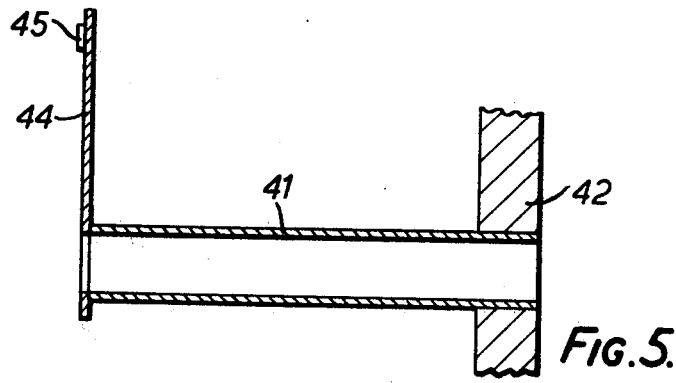
Figure 6:
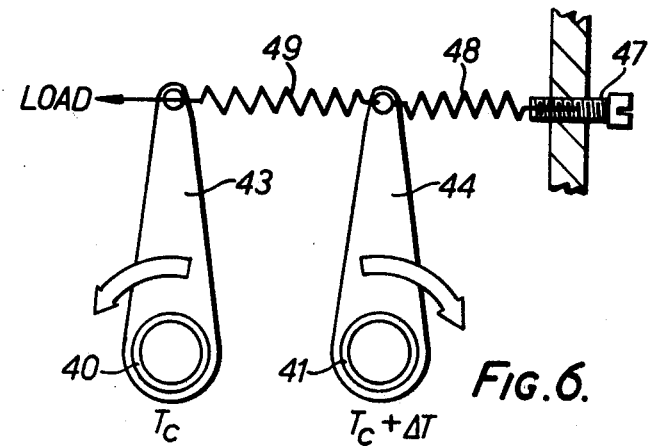

The invention will be more readily understood by way of example from the following description of differential temperature actuator in accordance therewith reference being made to the accompanying drawings, in which FIG. 1 shows a differential temperature actuator using leaf springs of shape memory effect alloy, FIG. 2 is a graph explaining the operation of the actuator of FIG. 1, FIG. 3 shows a modification using helical springs, FIGS. 4 and 5 are respectively a side view and an end view of an actuator using torsion tube springs, FIG. 6 shows a modification of the actuator of FIGS. 4 and 5, and FIGS. 7 and 8 illustrate the use of the actuator of FIGS. 4 and 5 for operating a discharge valve and a heat meter, respectively.

The actuator of FIG. 1 consists of a pair of similar leaf springs 12 and 13 secured between two fixtures 14 and 15 with a fixed part of each engaging against a different one of the fixtures and the free ends 12A and 13A in engagement with one another to form an indicating finger. The leaf springs when located as shown between the fixtures 14, 15 are elastically strained, the resulting stresses opposing one another. The leaf springs are made of the same shape memory effect alloy which is chosen to have a transition temperature range encompassing the range of ambient temperature to which the leaf springs are subject in use.

When the two leaf springs 12 and 13 are at the same temperature $T_c$, they are in the dispositon shown with the indicating finger centrally between the fixtures 14 and 15. No change in position of the finger occurs if the two leaf springs change equally in temperature, since the elastic moduli of the two springs alter equally. If, on the other hand, the temperature of one only of the springs changes, one spring becomes stiffer than the other and the position of the finger at which the stresses of the springs are balanced is altered. The position of the finger is thus an indication of the difference in temperature of the two springs 12 and 13 and that finger is capable of exerting a controlling force as indicated by the arrows 16.

A biasing spring may be applied to the indicating finger as shown in FIG. 1 at 17, that spring acting between the finger and an adjusting screw 18 threaded into the fixture 15. By operation of the screw 18, the bias applied can be varied; the adjustment enables the position of the indicating finger to be varied for zero temperature difference, and makes it possible to calibrate the actuator so that the finger reaches a given control position for a required temperature difference.

The operation of the actuator is explained by the diagram of FIG. 2 where force applied by each of the springs 12, 13 is plotted against deflection of the spring from the unstressed condition. The force/deflection characteristics of spring 12 for different temperatures within the transition range are represented by the family of curves 20, the gradient of those curves increasing with temperature, i.e. the spring becomes stiffer with rise in temperature. The force/deflection characteristics of the spring 13 are represented by the similar family of curves 21. The position of the indicating finger 12A, 13A is then represented by the intersection of the curve 20 pertaining to the temperature of spring 12 with the curve 21 pertaining to the temperature of spring 13.

When the springs 12, 13 are at the same temperature $T_c$, the $T_c$ curves 20, 21 intersect at the point 22 and, generally, whatever is the actual temperature of the springs, the intersection point is on a vertical line 23 when there is no temperature difference. The indicating finger thus has a constant position represented by that line. If now the temperature of spring 13 is $T_c + \Delta T$, while spring 12 remains at temperature $T_c$, the indicating finger takes up a new position, at which the forces applied by the springs are balanced, and which is defined by the intersection of the curve 20 for temperature $T_c$ with the curve 21 for temperature $T_c + \alpha T$, i.e. at the point 24. If the indicating finger is subject to zero restraint, the finger moves to the position represented by the horizontal displacement of point 24 from line 23. However if the finger is constrained to a smaller displacement indicated by $\alpha$, the finger is capable of exerting a load represented by the vertical arrow 27 between the $T_c$ line 20 and the $T_c + \Delta T$ line 21 at the displacement $\alpha$.

Instead of the leaf springs 12, 13 other forms of springs may be used, as exemplified by FIGS. 3, 4 and 5. In FIG. 3, helical springs 30, 31 of shape memory effect alloy are employed. The two springs are located on opposite sides of a fixed partition 32 and abut against it. An indicating shaft 33 passes centrally through springs 30, 31 and through a hole in partition 32. Secured to the shaft 33 are plates 34, 35 which engage against the free ends of the springs. The spacing of the plates are such that the two springs 30, 31 are held in compression.

The springs are similar in mechanical and thermal characteristics. When at the same temperature, the springs have the same stiffness and, as their stresses are balanced, the compression is the same for both springs and the shaft has a constant position. If, on the other hand, the springs are at different temperatures, the stiffnesses are different, and the stresses are balanced at different spring deflections; shaft 33 then adopts a position which is dependent on the temperature difference.

In FIGS. 4 and 5, opposed springs in the form of torsion tubes are utilised. Each tube 40 or 41 is held against movement at one end by being secured to a fixture 42, and has clamped to its other end a radial arm 43 or 44. The axes of torsion tubes 40, 41 are parallel with the arms 43, 44 lying in the same plane. The arms are turned in opposite senses so as to stress the tubes oppositely and the ends of the arms are connected together by a link 45 while the tubes are so stressed; link 45 is connected to the arms by pivot pins 46.

Tubes 40 and 41 are made of shape memory effect metal and have similar properties. Accordingly the angular position of arm 43 remains fixed provided the temperatures of the tubes are the same. When there is a temperature difference, the torsional stiffnesses of the tubes are different, the stresses of the tubes are balanced at different angular dispositions of arms 43, 44 and link 43 takes up a position dependent on the temperature difference.

As in FIG. 1, the actuator of FIGS. 4 and 5 can be calibrated by a calibrating screw 47 which acts on a spring 48 biasing the link 45. The rigid link 45 of FIGS. 4 and 5 can be replaced by a flexible coupling, illustrated in FIG. 6 as a spring 49. The use of such a flexible coupling changes the temperature difference/position characteristic of the actuator.

The differential temperature actuators of this invention may be used simply to indicate temperature difference at two locations, or to operate a controlling or other mechanism. Two examples of the controlling function are illustrated in FIGS. 7 and 8.

Figure 7:
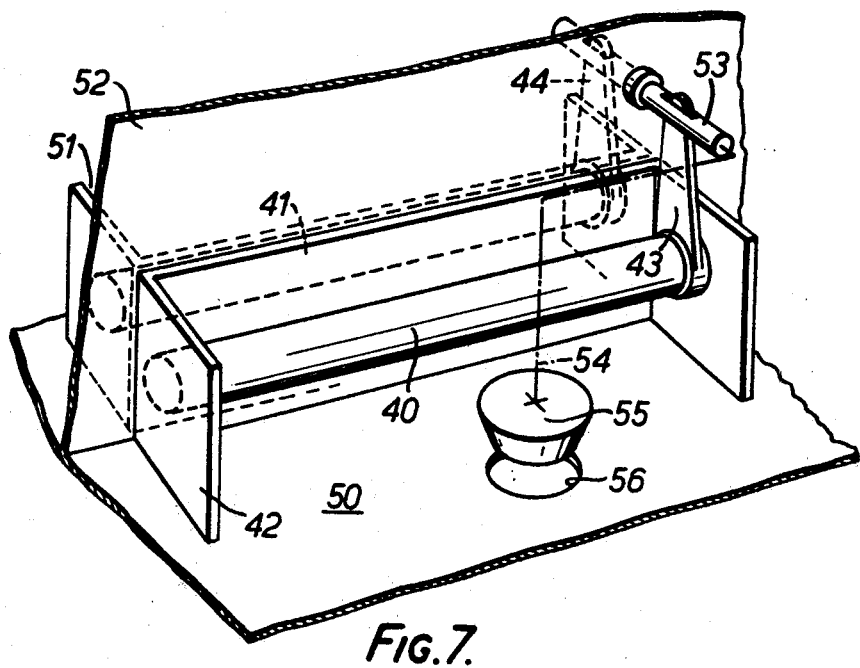

FIG. 7 shows a discharge valve, such as might be used in a waste heat recovery system. The valve is operated to dump a first liquid from its container when the temperature difference between that liquid and a second liquid falls below a given level. A differential temperature actuator similar to that of FIG. 4 and 5 is employed, like reference numerals being applied to like parts. Torsion tube 40 is located in a container 50 for relatively hot liquid, while torsion tube 41 is disposed in a container 51 separated from container 50 by a partition 52 and containing relatively cold liquid. The ends of arms 43 and 44 are shown as entering slots in a horizontally guided cross-head 53, which is coupled by any suitable linkage represented by the line 54 to a valve member 55 receivable in a valve opening 56 in the bottom of container 50.

As in FIGS. 4 and 5, the cross-head moves lengthwise according to the difference in temperatures of the liquids in containers 50 and 51. Provided that difference is greater than a prescribed value, the valve opening 56 remains closed by the valve member 55. However, when the temperature difference falls below that value, the resulting movement of cross-head 53 causes, through linkage 54, the valve member 55 to be lifted out of opening 56 and the discharge of the liquid in container 50.

Figure 8:
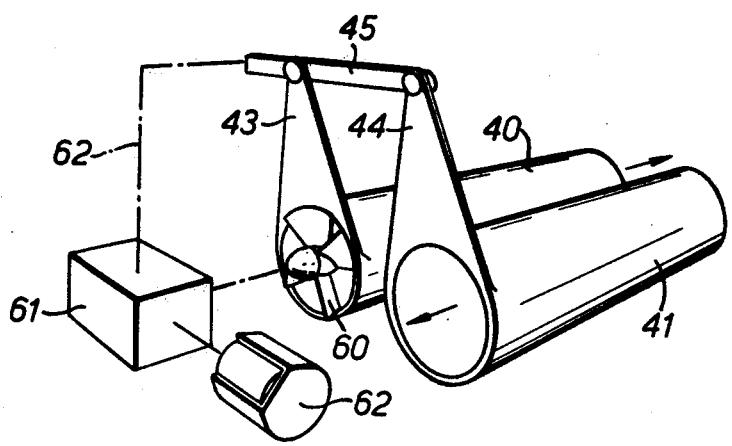

A heat meter is shown in FIG. 8 utilising two linked torsion tubes 40, 41 similar to those of FIGS. 4 and 5. Those tubes 40 and 41 form part of the inlet and outlet pipework of a hot water heating system, the incoming hot water passing through torsion tube 40 and the outgoing cold water through torsion tube 41. Link 45 then takes up a position determined by the difference in temperature of the two water flows. A conventional flowmeter, represented by a rotor 60 in tube 40 coupled to control equipment 61, measures the flow of water in the system. Link 45 is coupled, through any suitable means represented by line 62, to control equipment 61 in which the measured flow and the measured temperature difference are multiplied, and the resulting rate of heat flow is integrated and displayed in a unit 62.

The temperature-responsive springs 12, 13; 30, 31; and 40, 41 are make of any shape memory effect alloy having the required properties. It is however preferred to employ a suitable heat treated copper-zinc-aluminum alloy having a composition by weight of the order of:

copper—70%
zinc—26%
aluminum—4% the actual propertions of the constituents differing in minor respects from those figures, according to the required working temperatures of the springs.

What we claim is:
1. A differential temperature detector comprising
  (a) a first resilient member having a fixed part and a relatively movable part; and
  (b) a second resilient member having a fixed part and a relatively movable part;
  (c) each of said first and second resilient members being made essentially of a shape memory effect material having an elastic modulus which varies significantly with temperature in a reversible manner over a transition temperature range,
  (d) said movable parts of said resilient members being coupled together with said members stressed in opposition,
  (e) whereby the position of said movable part of one of said members relative to said fixed part is indicative of the difference in temperatures of said members.

2. A differential temperature detector as claimed in claim 1, wherein each of said resilient means is a helical compression spring.

3. A differential temperature detector as claimed in claim 2 comprising
   (a) a first helical compression spring made of said material;
   (b) a second helical compression spring made of said material;
   (c) fixed abutment means;
   (d) one end of each of said first and second springs engaging against an opposite side of said abutment means; and
   (e) coupling means between the other ends of said springs;
   (f) both said springs being stressed compressively by said coupling means.

4. A differential temperature detector as claimed in claim 1, wherein
   (a) each of said resilient means is a leaf spring,
   (b) one end of one of said springs abutting against one end of the other said spring, and
   (c) said springs being stressed in opposition.

5. A differential temperature detector as claimed in claim 1, wherein
   (a) each of said resilient means is a stressed torsion tube, and including
   (b) radial arms carried by said torsion tubes, and
   (c) coupling means between said arms and retaining said tubes in torsional stress.

6. A differential temperature detector as claimed in claim 5, in which said coupling means are rigid.

7. A differential temperature detector as claimed in claim 5, wherein said coupling means are flexible.

8. A differential temperature detector as claimed in claim 1, wherein said material is an alloy exhibiting martensitic transformation.

9. A differential temperature detector as claimed in claim 8, wherein said alloy is a copper-zinc-aluminum alloy.

10. A differential temperature detector as claimed in claim 1, further comprising
    (a) a first container for a first liquid, said first resilient member being located in said first container,
    (b) a second container for a second liquid, said second resilient member being located in said second container,
    (c) valve means in one of said containers for discharging liquid therefrom, and
    (d) a linkage between said coupling means and said valve means, whereby said valve means are opened when the temperature difference of said liquids falls below a given value.

11. A differential temperature detector as claimed in claim 1, wherein
    said first and second resilient means are in contact with a fluid at different temperatures,
    and further comprising a flow meter for measuring the flow of said fluid, and computing means controlled by said coupling means and said flow meter to give an indication of heat transmitted.

* * * * *